US008736778B2

(12) United States Patent
Burgess

(10) Patent No.: US 8,736,778 B2
(45) Date of Patent: May 27, 2014

(54) OPTICALLY ADDRESSED LIGHT VALVE COMPRISING TWO PHOTOCONDUCTING LAYERS PLACED ON EACH SIDE OF AN ELECTRO-OPTICAL MODULATOR

(75) Inventor: Christopher David Burgess, Salisbury (GB)

(73) Assignee: The Secretary of State for Defence in Her Britannic Majesty's Government of the United Kingdom of Great Britain and Nothern Ireland (GB)

( * ) Notice: Subject to any disclaimer, the term of this patent is extended or adjusted under 35 U.S.C. 154(b) by 0 days.

(21) Appl. No.: 13/383,213

(22) PCT Filed: Jul. 15, 2010

(86) PCT No.: PCT/GB2010/001350
§ 371 (c)(1),
(2), (4) Date: Jan. 10, 2012

(87) PCT Pub. No.: WO2011/007144
PCT Pub. Date: Jan. 20, 2011

(65) Prior Publication Data
US 2012/0105773 A1 May 3, 2012

(30) Foreign Application Priority Data

Jul. 15, 2009 (GB) .................................. 0912258.1
Sep. 15, 2009 (GB) .................................. 0916102.7

(51) Int. Cl.
*G02F 1/135* (2006.01)
*G02F 1/1335* (2006.01)

(52) U.S. Cl.
USPC ............................................. 349/25; 349/96

(58) Field of Classification Search
USPC ............................................................ 349/25
See application file for complete search history.

(56) References Cited

U.S. PATENT DOCUMENTS

| 4,726,660 | A | 2/1988 | Rushford |
| H737 | H | 2/1990 | Rushford |
| 5,227,902 | A | 7/1993 | Takanashi et al. |
| 6,560,001 | B1 * | 5/2003 | Igasaki et al. ................. 359/245 |
| 8,525,943 | B2 | 9/2013 | Burgess et al. |
| 2012/0099035 | A1 | 4/2012 | Burgess |

FOREIGN PATENT DOCUMENTS

| FR | 2660447 | 10/1991 |
| FR | 2912230 | 8/2008 |
| GB | 2230346 | 10/1990 |
| GB | 2471949 | 4/2012 |
| GB | 2471950 | 4/2012 |
| JP | 08262483 | 10/1996 |
| WO | 03/073159 | 9/2003 |
| WO | 2005/116719 | 12/2005 |
| WO | 2011007143 | 1/2011 |

OTHER PUBLICATIONS

International Search Report dated Oct. 27, 2010 in connection with International Patent Application PCT/GB2010/001350.

(Continued)

*Primary Examiner* — Wen-Ying P Chen
(74) *Attorney, Agent, or Firm* — Dean W. Russell; Kristin M. Crall; Kilpatrick Townsend & Stockton LLP

(57) ABSTRACT

An optically addressed light valve suitable for selectively limiting the transmission of radiation from high intensity light sources comprising an electro-optical modulator sandwiched by two photoconductive layers.

8 Claims, 6 Drawing Sheets

(56) References Cited

OTHER PUBLICATIONS

Search report dated Dec. 2, 2009 in connection with U.K. Patent Application No. 0916102.7.
C. Longeaud, et al., "Characterization of defect levels in semi-insulating 6H-SiC by means of photoinduced transient spectroscopy and modulated photocurrent technique," Journal of Physics: Condensed Matter, Bristol, UK, vol. 21, No. 4, Jan. 28, 2009, p. 45801 (14 pages).
International Search Report dated Oct. 25, 2010 in Application No. PCT/GB2010/001349.
Search Report dated Nov. 30, 2009 in UK Application No. 0916089.6.
Search Report dated Nov. 3, 2010 in UK Application No. 1011872.7.
C. James, et al., "Compact Silicon Carbide Switch for High Voltage Operation," Proceedings of the IEEE International Power Modulators and High Voltage Conference, New Jersey, May 27, 2008, pp. 17-20.

* cited by examiner

OPTICALLY ADDRESSED LIGHT VALVE COMPRISING TWO PHOTOCONDUCTING LAYERS PLACED ON EACH SIDE OF AN ELECTRO-OPTICAL MODULATOR

CROSS REFERENCE TO RELATED APPLICATIONS

This application is the U.S. national phase of International Application No. PCT/GB2010/001350 filed on Jul. 15, 2010, and published in English on Jan. 20, 2011, as International Publication No. WO 2011/007144 A1, which application claims priority to Great Britain Patent Application No. 0912258.1 filed on Jul. 15, 2009, and Great Britain Patent Application No. 0916102.7 filed on Sep. 15, 2009, the contents of all of which are incorporated herein by reference.

TECHNICAL FIELD OF THE INVENTION

This invention relates to a nonlinear optical device and more particularly to an optically addressed light valve suitable for selectively limiting the transmission of radiation from high intensity light sources.

BACKGROUND TO THE INVENTION

Dazzle, by high intensity light sources, is a common problem in optical systems or imaging devices, causing damage to the sensor, degradation of image quality or loss of situational awareness for the user. The problem occurs when high intensity light sources such as sunlight, welding arc, car head lamps or lasers are directed at the system or device. Saturation or dazzle especially by laser is now a common problem, both in military and civilian environments, as lasers themselves have become smaller, cheaper and more readily available. This, in turn, has led to the need to provide such systems and devices with electro-optic protection measures (EOPM) to limit or filter the transmission of light to the sensor. One approach to EOPM is to limit the effects of dazzle by spatial blocking using an optically addressed light valve (OALV).

One type of OALV works by coupling a photoresistor (PR) to a voltage dependent polarisation modulator, which may be a 90° twisted nematic, positioned between two polarisers. The polarizers may be set at predetermined angles relative to each other in order to remove a specific incoming wavelength. Both the PR and liquid crystal layer are situated between glass plates coated with transparent Indium Tin Oxide (ITO) to act as electrodes. A sinusoidal or square-wave voltage is applied to these ITO layers via wires attached using solid crystalline indium. The PR is a material whose bulk electrical conductivity can be altered by the presence of light. Typically photogenerated charges cause the resistivity to drop in response to light. In this way the voltage drop across the liquid crystal layer is determined by the intensity profile of light falling on the device.

One type of OALV incorporates a photoresistor fabricated from Bismuth Silicon Oxide (BSO). BSO has excellent photoconductive properties, including a high dark conductivity (conductivity in the absence of light), making it a perfect candidate for OALV's. However, BSO is itself optically active. This means that it causes a wavelength-dependent rotation of linearly polarized light passing through the crystal medium. This optical activity means that known BSO OALV's are effective at selectively limiting a single predetermined detrimental wavelength. Since different wavelengths are rotated by the PR by different amounts, the analysing polarizer needs to be set at a predetermined angle to block a specific incoming wavelength.

By incorporating a known OALV into an optical system or imaging device, such as a camera, night vision device, sight, safety goggles etc the sensor can be effectively protected from dazzle by one predetermined detrimental wavelength.

SUMMARY OF THE INVENTION

It is an object of the invention to provide an OALV adapted to provide improved spatial optical limiting performance.

Accordingly the present invention provides an optically addressed light valve (OALV) for limiting transmission of high intensity light comprising:

Input and output polarisers;

a voltage-dependent polarisation modulator sandwiched between first and second photoresistor layers positioned between first and second transparent electrodes.

By associating each electrode with its own discrete layer of photoresistor material the performance of the device is enhanced.

It should be noted that the invention is applicable to any high intensity light source including ultraviolet and infra-red.

The voltage-dependent polarisation modulator preferably comprises a twisted nematic layer formed within a layer of liquid crystal. This can be formed by the application of uni-directionally rubbed polymer coatings adjacent to the two major faces of the liquid crystal layer. The local liquid crystal orientation is determined by the rubbing direction of the adjacent polymer layer, so that, if the rubbing directions are orthogonal, for example, a 90 degree helical liquid crystal structure is established through the thickness of the liquid crystal layer.

By replacing the single PR layer with two layers of PR situated either side of the liquid crystal, the field induced reorientation of the liquid crystal layer can be increased and therefore the performance of the device can be improved. In practice the liquid crystal layer needs to be at least 10 microns in thickness, however the breakdown of the helical structure of the twisted nematic, caused by the increased electric field strength generated by high intensity light falling on the photoresistor, is likely to penetrate the liquid crystal approximately 1-3 microns. Therefore, by positioning the liquid crystal between two layers of photoresistor a greater proportion of the liquid crystal thickness is contributing to the effect. Hence performance is enhanced.

The photoresistor layers may comprise bismuth silicon oxide (BSO) or any other suitable material having good photoconductive properties and a high dark conductivity (conductivity in the absence of light).

By utilising vanadium-doped silicon carbide (V—SiC) as the photoresistor layers the added advantages of broadband protection can be achieved. Where the photoresitor layer in inactive, such as V—SiC, the polarizers can be crossed, in order to provide broadband protection against dazzle. If an active photoresistor is used, such as BSO, the angle of the polarisers is adjusted dependent on the incoming wavelength that needs to be removed. The advantages of using V—SiC in an OALV device are more fully described in applicant's co pending British priority patent application number GB0912241.7 the contents of which are incorporated herein by reference.

The transparent electrodes may comprise indium tin oxide (ITO) applied as a coating to the outer surface of the photoresistor material.

Alternatively the first and second transparent electrodes conveniently comprise indium tin oxide (ITO) coated glass plates, although equivalent arrangements are known in the art.

By positioning an OALV in accordance with the invention substantially at the focal plane of an optical system or imaging device, high intensity incident light is focused to a point. Therefore, the device will block only the focused point of dazzle allowing the user to view the remainder of the image clearly.

BRIEF DESCRIPTION OF THE DRAWINGS

In order that the invention might be more fully understood, embodiments thereof will now be described, with reference to the accompanying drawings, in which.

DETAILED DESCRIPTION

Figure 1:
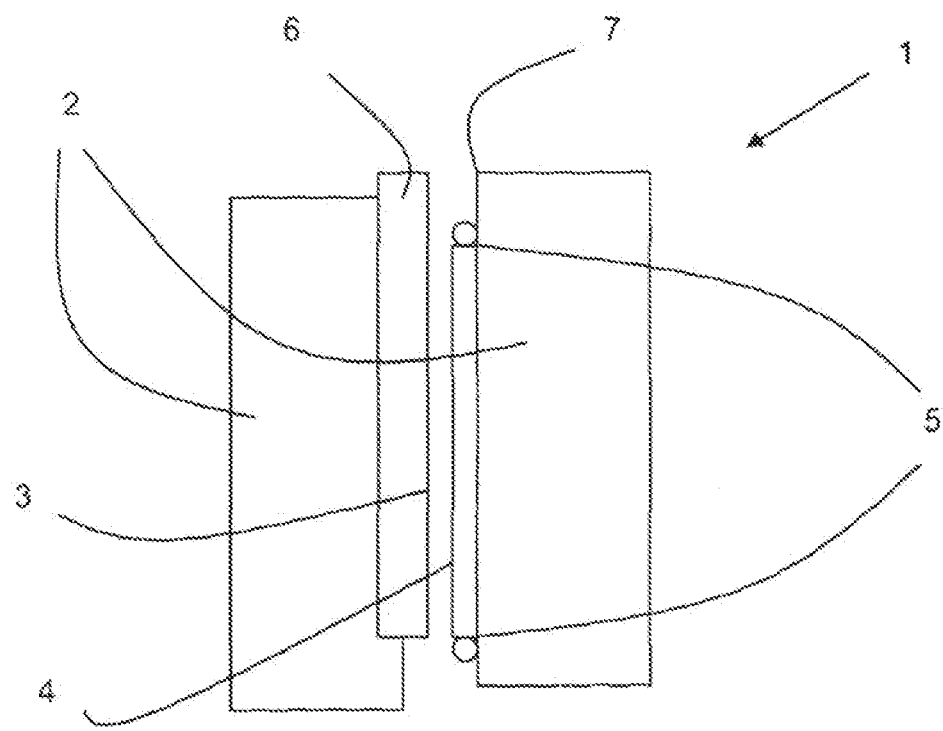
FIG. 1 illustrates a standard OALV design.

FIG. 1 illustrates a standard OALV design 1. Two glass plates are coated with transparent Indium Tin Oxide (ITO), to provide glass electrodes 2. A photoresistor 3 is coupled to a liquid crystal layer 4, with spacers 5 positioned to form a gap into which the liquid crystal is filled by capillary action. The glass electrodes 2 are electrically connected to a voltage 6 and to earth 7. These electrical connections 6 and 7 allow a sinusoidal or square wave voltage to be applied across the glass electrodes 2. These glass electrodes 2 are spin coated with a polymer layer and rubbed unidirectionally such that the local liquid crystal layer 4 orientation is determined by the rubbing direction. By constructing the device such that the two rubbing directions are orthogonal, a 90 degree helical structure is set up within the liquid crystal layer 4. This is known as a twisted nematic. Twisted nematic layers are voltage-dependent polarisation modulators.

Figure 2:
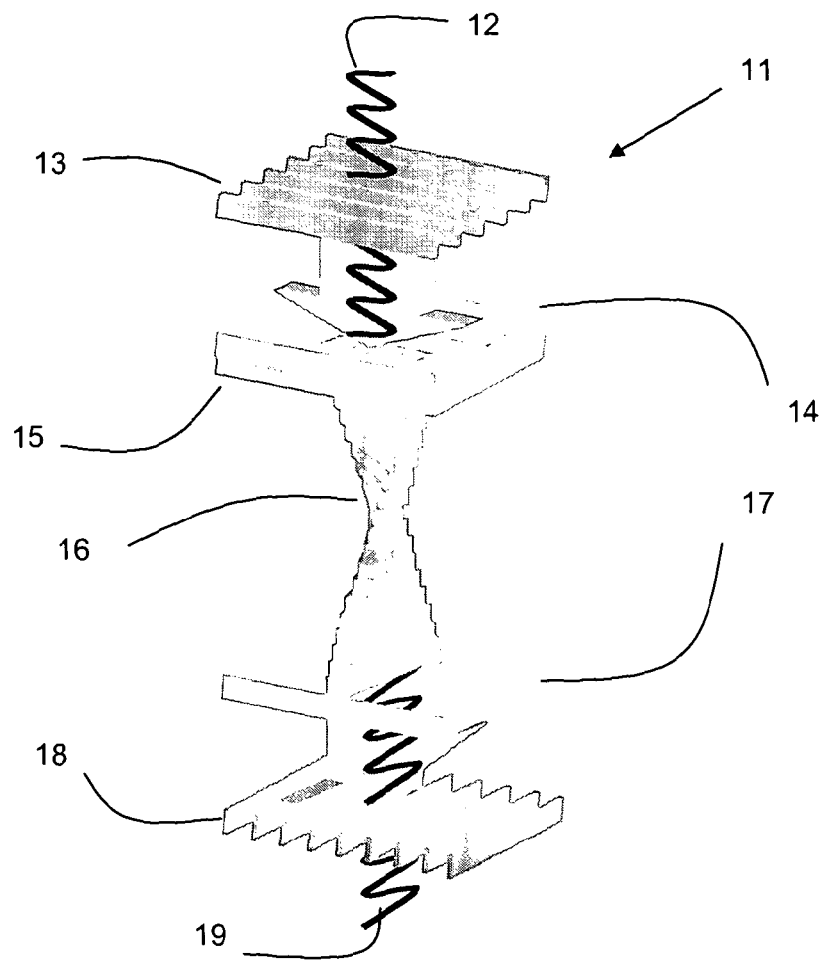
FIG. 2 illustrates the helical structure of a twisted nematic layer used for polarisation modulation.

FIG. 2 illustrates the effect of a twisted nematic layer 16 arranged between crossed polarizers 13, 18 in an OALV assembly 11. Low intensity light 12 enters into the OALV assembly 11 through input linear polarizer 13. The low intensity light 12 travels through the ITO coated glass electrode 14. As the light propagates through the twisted nematic layer 16 its direction of polarization is rotated along with the twisted nematic helix. The total twist angle of the twisted nematic layer 16 is 90 degrees. Therefore, since the total twist angle matches the angle between the crossed polarizers 13, 18 the low intensity light 19 is transmitted by the output linear polarizer 18. If high intensity light is incident on the device, photoconduction causes a local drop in the resistivity of the PR 15 and an associated increase in the electric field strength within the liquid crystal layer. This electric field causes the breakdown of the helical structure of the twisted nematic layer 16, switching off its twisting effect. Therefore, such high intensity light is not rotated like low intensity light, and is absorbed by the output linear polarizer 18.

Figure 3:
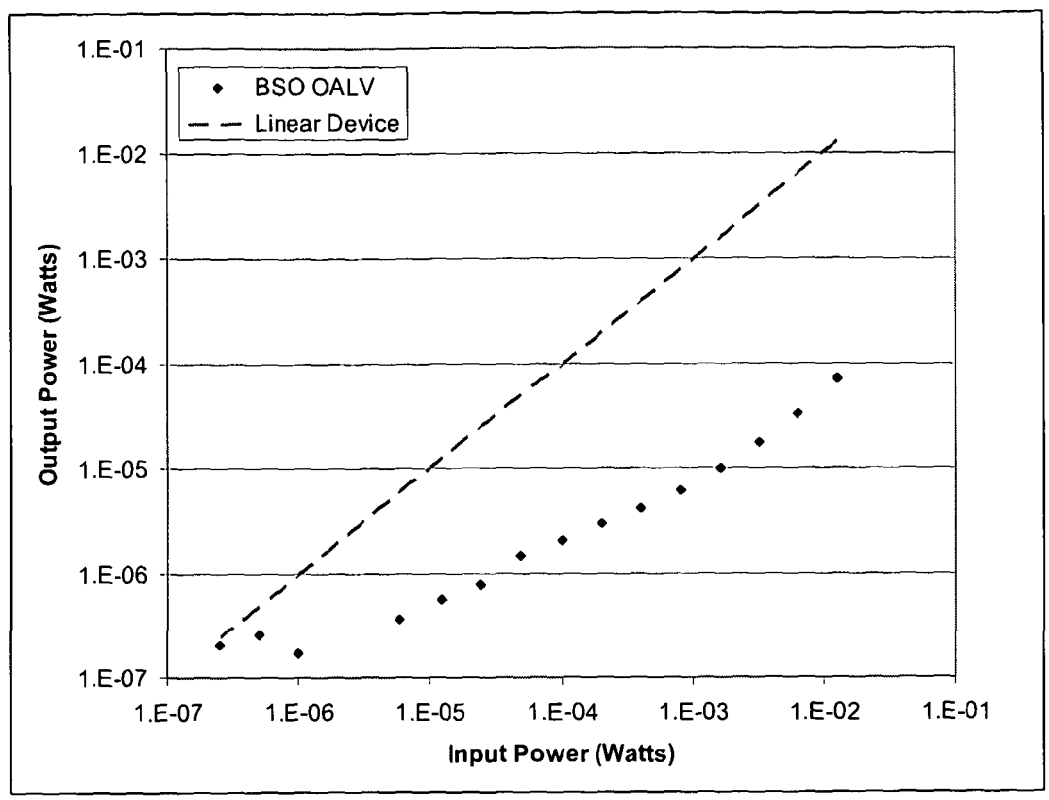
FIG. 3 shows the nonlinear response of a BSO OALV.

Since an OALV is a nonlinear optical device, its function can be characterised by a power scan measurement, in which the transmitted energy of the device is measured as the input energy is varied. A linear device (such as a plate of glass or an absorbing filter) will always transmit some fixed fraction of the input light, such that the output energy is a linear function of the input energy, whereas transmission by a nonlinear device will vary with input energy. FIG. 3 shows the nonlinear response of a standard BSO OALV compared to that of a linear device. The deviation from the linear response illustrates the effectiveness of the BSO OALV as an optical switch. In FIG. 3 the effects of absorption in the PR and polarizers have been removed.

Figure 4:
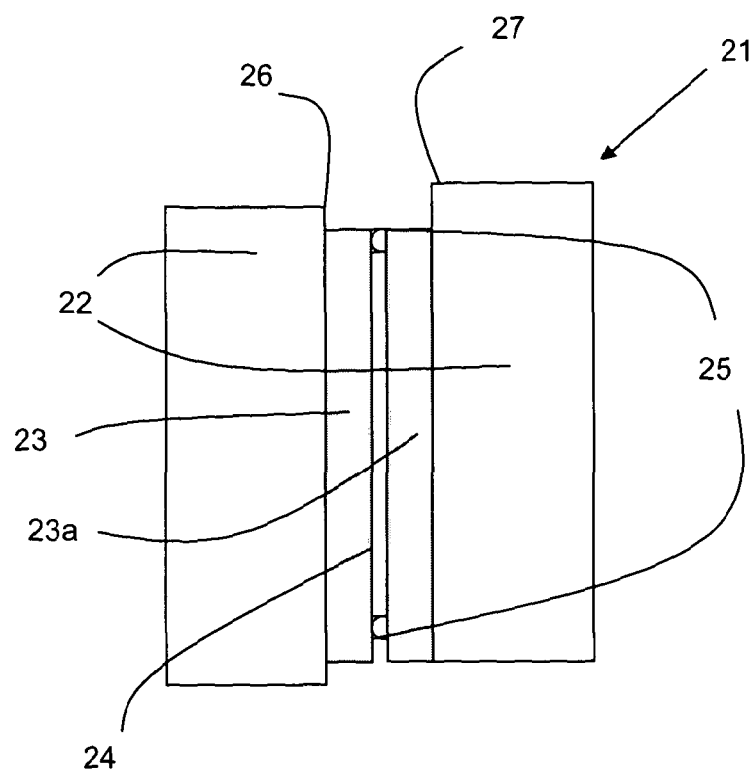
FIG. 4 illustrates an OALV in accordance with the invention (polarizers are not shown)

The applicant has successfully built an improved OALV structure in which the single BSO PR has been replaced by two layers of BSO PR situated either side of the liquid crystal layer. FIG. 4 illustrates a double PR OALV in accordance with the invention as an assembly 21 (polarisers are not shown). In common with FIG. 1 this embodiment comprises glass electrodes 22, a photoresistor (PR) layer 23, a liquid crystal layer 24, spacers 25, electrical connection 26 which connects to a voltage and electrical connection 27 which connects to ground. In this embodiment there is an additional photoresistor layer 23a. In this architecture each photoresistor is associated with its own electrode, each of which is driven by a square wave voltage such that at any time if the voltage on one electrode is +V then the voltage on the other is −V. The mathematics of the interaction of light with the device is dramatically altered by the addition of the second photoresistor.

The device was constructed in accordance with the following description. Glass electrodes 22 were 3.5 mm plates of Indium Tin Oxide (ITO) coated BK7 glass obtained from IngCrys Laser Systems Ltd. The PR layers 23, 23a were 25×25×0.3 mm BSO wafer optically polished on both 25×25 mm faces. An alignment layer of polyimide dissolved in methanol was then spin-coated onto one face of each BSO wafer. These polyimide layers were then rubbed using a velour cloth. The BSO PR layers 23, 23a were placed onto glass electrodes 22 such that their non-coated faces were in contact with the ITO and there was no gap between the glass electrodes 22 and the BSO PR layers 23, 23a. Spacer balls 25 (15 micron glass beads) were then applied between the two BSO PR layers 23, 23a such that the polyimide coated faces were in contact with the spacers 25. The rubbing direction applied to the polyimide coating on the face of the glass electrodes 22 must be orthogonal. The gap between the BSO PR layers 23, 23a was then filled with liquid crystal 24 via capillary action.

Once filled, the device was sealed around the edges using glue (not shown) and electrical wires 26 & 27 were soldered onto the ITO surfaces. In an alternative embodiment the ITO is applied to the outer surfaces of the BSO PR layers 23 and 23a, the ITO being applied to the BSO and not the glass.

Figure 5:
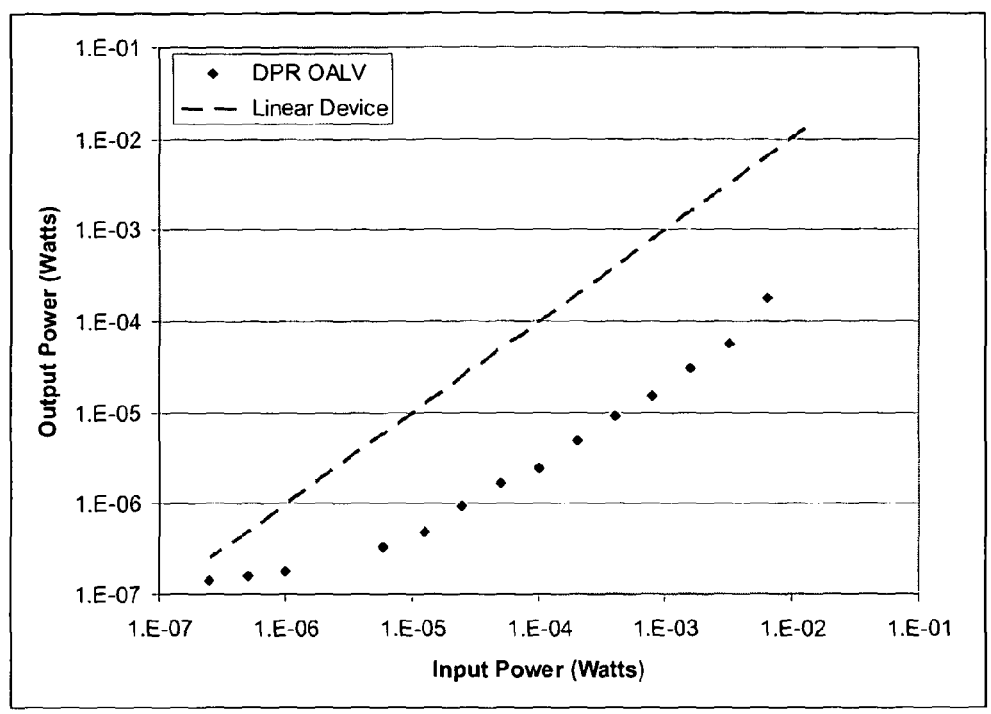
FIG. 5 shows the non linear optical response of a double PR OALV in accordance with the invention.

FIG. 5 shows the nonlinear optical response of the experimental double BSO PR OALV (diamonds) as well as a linear response (dashed line). In FIG. 5 the effects of absorption in the PR and polarizers have been removed. Clearly the DPR OALV is acting as a nonlinear device, evident due to the departure of the two lines. The positioning of two distinct PR's either side of the liquid crystal layer allows local perturbation of the liquid crystal structure at both surfaces, and therefore an increase in the total perturbed volume of liquid crystal. This increased perturbation results in an improved device performance.

Figure 6:
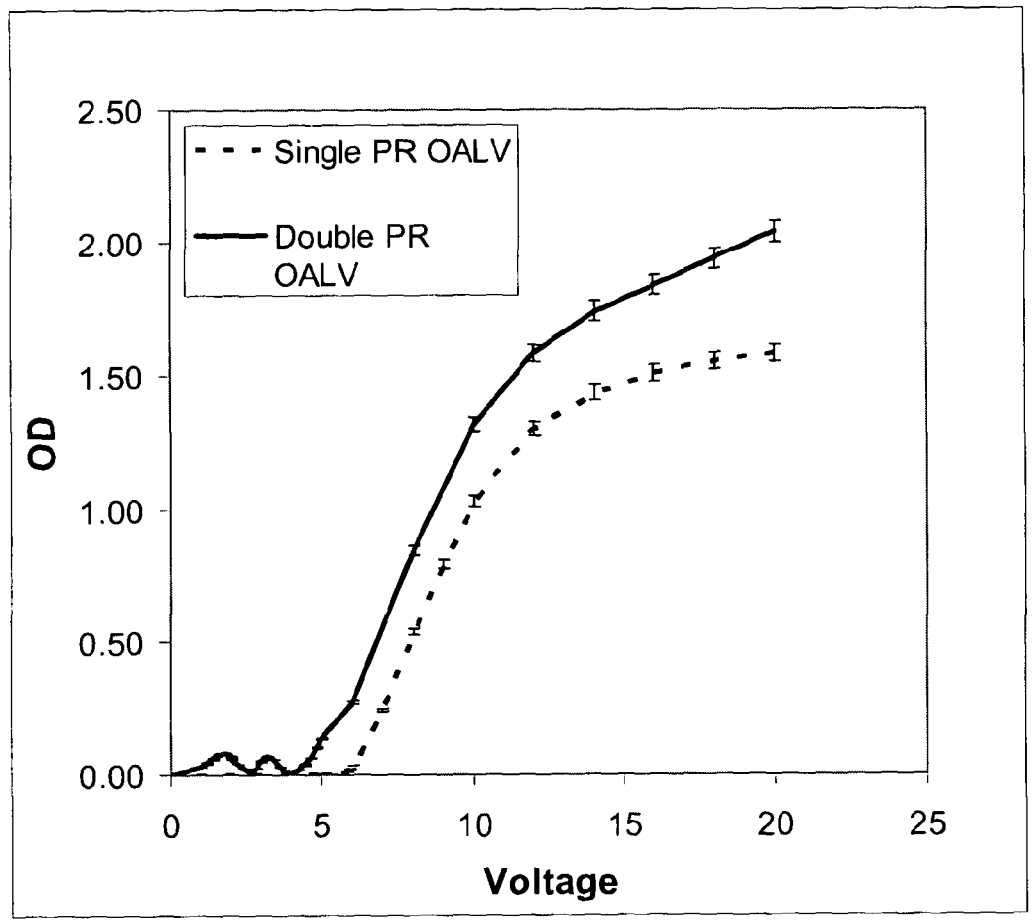
FIG. 6 shows a comparison of the Optical Density (OD) of a single and double PR OALV.

This increased performance is shown in FIG. 6, which shows the Optical Density (OD) of each type of device measured under identical conditions. The OD is defined as $$OD = -\log_{10}\left(\frac{T_{out}}{T_{in}}\right)$$

A higher OD means that more of the incoming light is being blocked, and therefore that the device is functioning better as an optical light valve. The dashed curve shows data for a device made with a single photoresister. The solid curve shows data obtained from a double-photoresistor device. It can be seen that in the voltage range 5-20 volts the OD of the DPR OALV was higher than that for the SPR OALV. This shows that if the DPR is positioned at the focal plane of an optical system or imaging device, an improved optical limiting performance is achieved.

The invention claimed is:

1. An optically addressed light valve (OALV) for limiting transmission of high intensity light comprising:
    An Input polariser and an output polariser;
    a voltage-dependent polarisation modulator sandwiched between first and second photoresistor layers positioned between first and second transparent electrodes, wherein low intensity light is transmitted by the output polariser and wherein high intensity light is absorbed by the output polariser.

2. An OALV as claimed in claim 1 wherein the voltage-dependent polarisation modular comprises a 90° twisted nematic layer formed within a layer of liquid crystal.

3. An OALV as claimed in claim 1 wherein the photoresistor layers comprise bismuth silicon oxide (BSO).

4. An OALV as claimed in claim 1 wherein the first and second transparent electrodes comprise indium tin oxide (ITO) coatings applied to the outer surface of the photoresistor layers.

5. An OALV as claimed in claim 1 wherein the first and second transparent electrodes comprise indium tin oxide (ITO) coated glass plates.

6. An optical system or imaging device comprising an OALV as claimed in claim 1 positioned at or near a focal plane so that an image can be formed on the OALV.

7. An OALV as claimed in claim 1, wherein the photoresistor layers comprise vanadium-doped silicon carbide (V—SiC).

8. An OALV as claimed in claim 1, wherein the input and output polarizers are crossed.

* * * * *

UNITED STATES PATENT AND TRADEMARK OFFICE
CERTIFICATE OF CORRECTION

| | | |
|---|---|---|
| PATENT NO. | : 8,736,778 B2 | |
| APPLICATION NO. | : 13/383213 | |
| DATED | : May 27, 2014 | |
| INVENTOR(S) | : Christopher David Burgess | |

It is certified that error appears in the above-identified patent and that said Letters Patent is hereby corrected as shown below:

In the Claims

In column 6, line 5, in claim 2, delete "modular" and insert -- modulator --.

Signed and Sealed this
Fifth Day of May, 2015

Michelle K. Lee
*Director of the United States Patent and Trademark Office*